(12) United States Patent
Lind et al.

(10) Patent No.: US 10,598,380 B2
(45) Date of Patent: Mar. 24, 2020

(54) CANTED COMBUSTOR FOR GAS TURBINE ENGINE

(71) Applicant: General Electric Company, Schenectady, NY (US)

(72) Inventors: David Albin Lind, Lebanon, OH (US); Rishikesh Karande, Thane (IN); Pradeep Naik, Bangalore (IN); Ajoy Patra, Bangalore (IN); Gregory Allen Boardman, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 210 days.

(21) Appl. No.: 15/711,203

(22) Filed: Sep. 21, 2017

(65) Prior Publication Data

US 2019/0086085 A1    Mar. 21, 2019

(51) Int. Cl.
*F23R 3/04* (2006.01)
*F23R 3/00* (2006.01)
(Continued)

(52) U.S. Cl.
CPC ............... *F23R 3/04* (2013.01); *F02C 7/12* (2013.01); *F02C 7/24* (2013.01); *F23R 3/002* (2013.01);
(Continued)

(58) Field of Classification Search
CPC .... F23R 3/02; F23R 3/002; F23R 3/04; F23R 3/10; F23R 3/46; F23R 3/50; F23R 3/54; F23R 2900/03045
See application file for complete search history.

(56) References Cited

U.S. PATENT DOCUMENTS

| 4,380,895 A | 4/1983 | Adkins |
| 5,094,069 A | 3/1992 | Boffo |

(Continued)

FOREIGN PATENT DOCUMENTS

| EP | 1588102 B1 | 11/2008 |
| JP | 2006/002764 A | 1/2006 |

(Continued)

OTHER PUBLICATIONS

Machine Translated Japanese Office Action Corresponding to Application No. 2018167443 dated Nov. 15, 2019.

*Primary Examiner* — Scott J Walthour
*Assistant Examiner* — Colin J Paulauskas
(74) *Attorney, Agent, or Firm* — Dority & Manning, P.A.

(57) ABSTRACT

The present disclosure is directed to a combustion section for a gas turbine engine including a combustor assembly, an outer casing, a fuel injector assembly, and an inner casing. An inner liner and an outer liner are each extended at least partially along a lengthwise direction and at an acute angle. A dome assembly is extended between the inner liner and the outer liner, and the inner liner, and the outer liner together define a combustion chamber therebetween. A bulkhead assembly defining a plurality of walls is coupled to the inner liner and generally surrounding the outer liner and dome assembly. The outer casing surrounds the combustor assembly. The inner casing, the outer casing, and the combustor assembly together define a primary flowpath. An oxidizer flows through the primary flowpath in serial flow through the plenum and the fuel injector assembly into the combustion chamber.

20 Claims, 8 Drawing Sheets

(51) Int. Cl.
- *F23R 3/28* (2006.01)
- *F02C 7/24* (2006.01)
- *F02C 7/12* (2006.01)
- *F23R 3/02* (2006.01)
- *F23R 3/50* (2006.01)

(52) U.S. Cl.
CPC ................ *F23R 3/02* (2013.01); *F23R 3/28* (2013.01); *F23R 3/50* (2013.01); *F05D 2220/32* (2013.01); *F05D 2240/128* (2013.01); *F05D 2240/35* (2013.01); *F05D 2260/99* (2013.01); *F23R 2900/00014* (2013.01)

(56) References Cited

U.S. PATENT DOCUMENTS

| | | | |
|---|---|---|---|
| 5,307,624 A | | 5/1994 | Even-Nur et al. |
| 5,329,761 A | | 7/1994 | Ablett et al. |
| 5,644,918 A | * | 7/1997 | Gulati .............. F23R 3/002 431/114 |
| 6,494,044 B1 | | 12/2002 | Bland |
| 7,237,387 B2 | | 7/2007 | Aumont et al. |
| 7,350,360 B2 | | 4/2008 | Graf et al. |
| 7,788,928 B2 | | 9/2010 | De Sousa et al. |
| 7,874,138 B2 | | 1/2011 | Rubio et al. |
| 8,082,738 B2 | | 12/2011 | Cornelius et al. |
| 8,313,324 B2 | | 11/2012 | Bulat et al. |
| 8,479,519 B2 | | 7/2013 | Chen et al. |
| 8,572,982 B2 | | 11/2013 | Tiemann |
| 9,080,770 B2 | | 7/2015 | Dudebout et al. |
| 2007/0199325 A1 | * | 8/2007 | Tanimura .............. F23R 3/04 60/740 |
| 2010/0272953 A1 | | 10/2010 | Yankowich et al. |
| 2011/0110761 A1 | * | 5/2011 | Haehnle ............. F01D 9/023 415/115 |
| 2011/0203287 A1 | | 8/2011 | Chila et al. |
| 2011/0239619 A1 | | 10/2011 | Omae et al. |
| 2012/0234012 A1 | | 9/2012 | Brown et al. |
| 2016/0010555 A1 | | 1/2016 | Suciu et al. |
| 2016/0025006 A1 | * | 1/2016 | Propheter-Hinckley .............. F02C 7/08 165/51 |
| 2016/0178207 A1 | | 6/2016 | Bothien et al. |
| 2016/0209034 A1 | | 7/2016 | Maurer et al. |
| 2017/0067635 A1 | | 3/2017 | Zong et al. |
| 2017/0067639 A1 | | 3/2017 | Zong et al. |
| 2017/0082023 A1 | * | 3/2017 | Lindman ............. B01D 53/22 |

FOREIGN PATENT DOCUMENTS

| | | | |
|---|---|---|---|
| JP | 2007/212129 A | 8/2007 | |
| WO | WO-2010077764 A1 * | 7/2010 | ............... F23R 3/00 |

* cited by examiner

CANTED COMBUSTOR FOR GAS TURBINE ENGINE

FIELD

The present subject matter relates generally to gas turbine engine combustor assemblies.

BACKGROUND

Gas turbine engines, such as power generating gas turbine engines, are subject to increasingly strict emissions regulations. Additionally, many power generating gas turbine engines, such as marine or industrial gas turbine engines, are derived from aero gas turbine engines initially designed for aircraft propulsion. However, aero gas turbine engines often prioritize decreasing axial and/or radial dimensions while generating a similar or greater energy output. As such, decreased aero gas turbine engine dimensions may adversely affect combustion assemblies for power generating gas turbine engines, such as by reducing a flowpath length available for sufficient fuel-air mixing necessary to meet or exceed emissions regulations.

Known combustor assemblies undesirably include significant pressure losses, flow non-uniformity, decreased backflow margins, or insufficient flowpath length, volume, and residence time for combustion gases, thereby reducing performance, increasing emissions, and reducing durability. As such, there is a need for a combustor assembly for a gas turbine engine that increases a combustor flowpath and premixer length while reducing pressure losses, enables flow uniformity, and improves backflow margins to improve performance, durability, and emissions output.

BRIEF DESCRIPTION

Aspects and advantages of the invention will be set forth in part in the following description, or may be obvious from the description, or may be learned through practice of the invention.

The present disclosure is directed to a combustion section for a gas turbine engine. The combustion section includes a combustor assembly, an outer casing, a fuel injector assembly, and an inner casing. The combustor assembly includes an inner liner and an outer liner each extended at least partially along a lengthwise direction and at an acute angle relative to the longitudinal centerline. The combustor assembly further includes a dome assembly extended between the inner liner and the outer liner. The dome assembly, the inner liner, and the outer liner together define a combustion chamber therebetween. The combustor assembly still further includes a bulkhead assembly defining a plurality of walls coupled to the inner liner and generally surrounding the outer liner and dome assembly. At least a portion of the bulkhead assembly is extended at least partially along a forward direction and defines a plenum between the bulkhead assembly and the dome assembly. The outer casing surrounds the combustor assembly and is extended at least partially co-directional to the combustor assembly. The fuel injector assembly is extended through the outer casing, the bulkhead assembly, and the dome assembly. The inner casing, the outer casing, and the combustor assembly together define a primary flowpath in direct fluid communication with the combustion chamber. The primary flowpath is extended at least along a forward direction and an aft direction defined by inner casing, the outer casing, and the combustor assembly. An oxidizer flows through the primary flowpath in serial flow through the plenum and the fuel injector assembly into the combustion chamber.

In various embodiments, the combustion section further includes an inner casing fairing coupled to the inner casing. The inner casing fairing is extended at least partially co-directional with the inner liner and directs the flow of oxidizer from between the outer casing and the inner casing along the forward direction to the aft direction between the outer casing and the inner liner. In one embodiment, the inner casing fairing defines a tip extended at least partially outward along the radial direction, and wherein the tip defines one or more tip openings. In another embodiment, the inner casing fairing defines the one or more tip openings as a plurality of rows of tip openings extended therethrough to a passage defined between the inner liner and the inner casing fairing. The plurality of rows of tip openings defines at least a first row defining a cross sectional area smaller than a second row defining a larger cross sectional area downstream of the first row. In another embodiment, the inner casing fairing defines a port disposed between approximately 30% and 70% axial span of the combustion chamber. The port provides a flow of oxidizer to a nozzle assembly of a turbine section.

In still another embodiment, the combustion section further includes a fairing wall disposed between the inner casing fairing and a nozzle assembly. The fairing wall and the inner casing fairing together define a third cavity therebetween. A flow of oxidizer egresses from the third cavity to the nozzle assembly to provide cooling therethrough.

In one embodiment of the combustion section, the fuel injector assembly includes a fuel injector fairing defining a contoured wall extended at least partially toward a direction from which the flow of oxidizer comes within the plenum. The fuel injector fairing guides the flow of oxidizer from the plenum through the fuel injector assembly to the combustion chamber.

In various embodiments, the bulkhead assembly defines a contoured fairing directing the flow of oxidizer from an inward radial direction to an outward radial direction between the outer liner and bulkhead assembly. In one embodiment, the contoured fairing defines a first cavity therewithin. The first cavity provides damping of flow fluctuation of the flow of oxidizer in the primary flowpath. In another embodiment, at least a portion of the contoured fairing defines a substantially radial portion coupling the contoured fairing to a mount member extended from the outer casing to the combustion assembly. The radial portion promotes flow attachment to the contoured fairing, the outer liner, or both.

In yet another embodiment, the combustion section further includes a damper member extended from the dome assembly to the bulkhead assembly, in which the damper member provides attenuation of acoustic modes.

In still another embodiment, the combustion section further includes a damper assembly extended from the dome assembly toward the bulkhead assembly. The damper assembly is disposed in circumferential arrangement between two or more fuel injector assemblies. In one embodiment, the damper assembly defines one or more damper passages extended within a wall of the damper assembly. The damper passage defines a volume configured to damper one or more acoustic modes.

In one embodiment, the combustor assembly further includes one or more resonator tubes disposed through the outer casing and the bulkhead assembly in fluid communication with the plenum.

In still yet another embodiment, the combustion section further includes an accessory extended through the outer casing, the contoured fairing, and at least partially through the outer liner. The accessory defines one or more of an igniter, a sensor, or both.

In another embodiment, the bulkhead assembly defines a bulkhead opening extended therethrough. The bulkhead opening provides a flow of oxidizer therethrough to the plenum defined between the bulkhead assembly and the dome assembly.

In various embodiments, the combustion section further includes a mount member extended from the outer casing to the combustion assembly. In one embodiment, the mount member defines a first opening through which the primary flowpath extends in fluid communication with the plenum defined between the dome assembly and the bulkhead assembly.

In another embodiment, the acute angle of the combustor assembly is between approximately 10 degrees and approximately 85 degrees relative to the longitudinal centerline.

In various embodiments, the bulkhead assembly defines a second wall extended at least partially along a forward axial direction generally co-directional to the outer casing. A plurality of second wall openings is defined therethrough providing fluid communication between the plenum and the primary flowpath between the outer casing and the bulkhead assembly. In one embodiment, the second wall defines a plurality of circumferential rows of second wall openings. The plurality of circumferential rows is defined in increasing cross sectional area along a forward direction of the flow of oxidizer.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
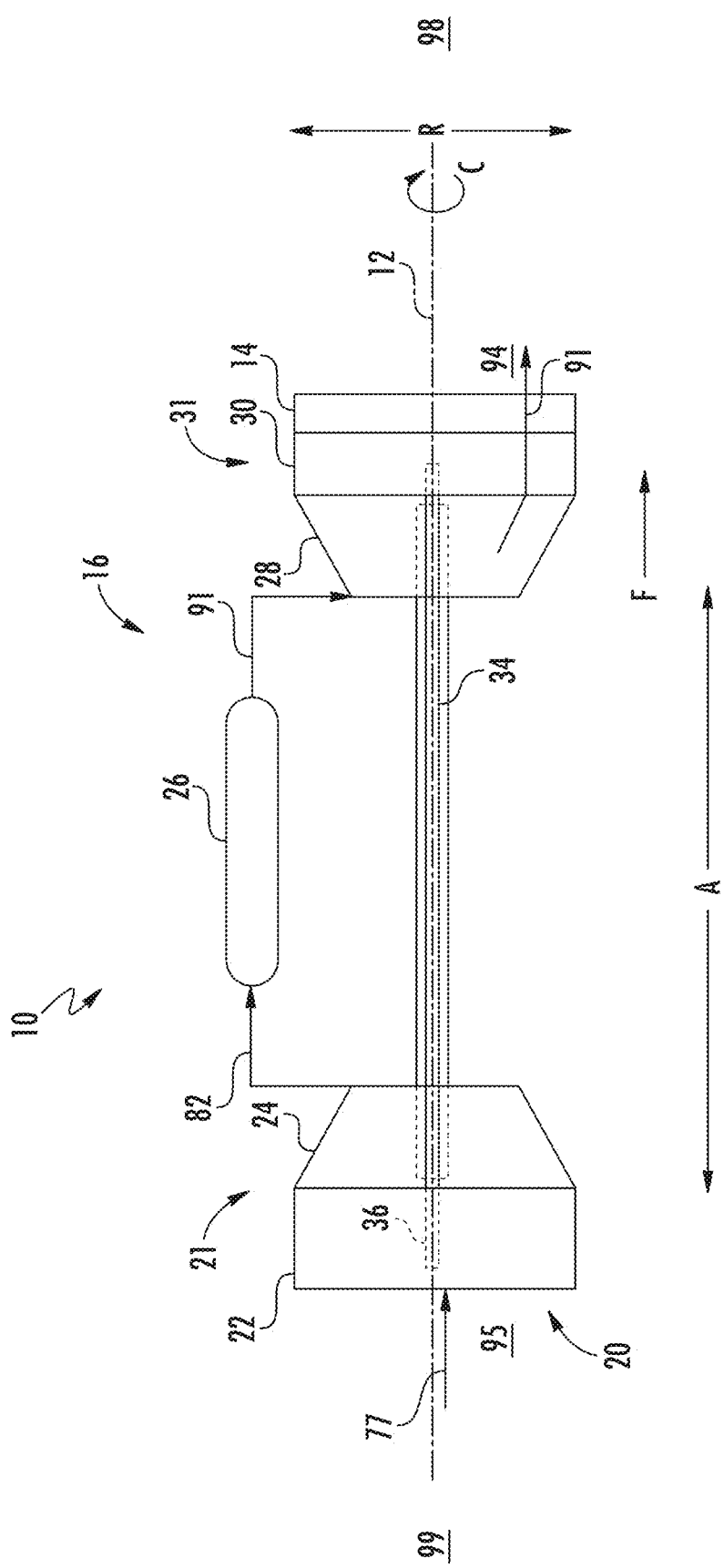
FIG. 1 is a schematic cross sectional view of an exemplary gas turbine engine incorporating an exemplary combustor assembly according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a combustor assembly for a gas turbine are generally provided that may increase a combustor flowpath and premixer length while reducing pressure losses, enabling flow uniformity, and improving backflow margins to improve performance, durability, and emissions output (e.g., reduced CO emissions). Embodiments of the combustor assembly generally provided herein include a canted or angled combustor that reduces dump and tuning losses, and pressure losses generally, and utilizes approximately all of the flowpath air (i.e., compressor exit air) for combustor assembly cooling and combustion, and provides an increased flowpath length while maintaining or reducing a length of the combustor/diffuser assembly and an overall gas turbine engine length, or more specifically, a gas generator core length, for a power generating gas turbine engine derived from an aero gas turbine engine.

Referring now to the drawings, FIG. 1 is a schematic partially cross-sectioned side view of an exemplary gas turbine engine 10 herein referred to as "engine 10" as may incorporate various embodiments of the present disclosure. Although further described below with reference generally to a gas turbine engine, the present disclosure is also applicable to turbomachinery in general, including marine and industrial gas turbine engines, auxiliary power units, and gas turbine engine cores for turbofan, turbojet, turboprop, and turboshaft gas turbine engines.

As shown in FIG. 1, the engine 10 has a longitudinal or axial centerline axis 12 that extends there through for reference purposes. The engine 10 defines an axial direction A and an upstream end 99 and a downstream end 98. The upstream end 99 generally corresponds to an end of the engine 10 from which air enters the engine 10 and the downstream end 98 generally corresponds to an end at which air exits the engine 10 generally opposite of the upstream end 99. In general, the engine 10 may include a gas generator or core engine 16 disposed upstream of a power turbine 14. The power turbine 14 is generally coupled to an electrical load device generating and providing power to a system or grid.

The core engine 16 may generally include a substantially tubular outer casing that defines an annular inlet 20. The outer casing encases or at least partially forms, in serial flow relationship, a compressor section 21 having a booster or low pressure (LP) compressor 22, a high pressure (HP) compressor 24, a combustion section 26, and a turbine section 31 including a high pressure (HP) turbine 28, a low pressure (LP) turbine 30 and the power turbine 14. A high pressure (HP) rotor shaft 34 drivingly connects the HP turbine 28 to the HP compressor 24. A low pressure (LP) rotor shaft 36 drivingly connects the LP turbine 30 to the LP compressor 22.

Figure 2:
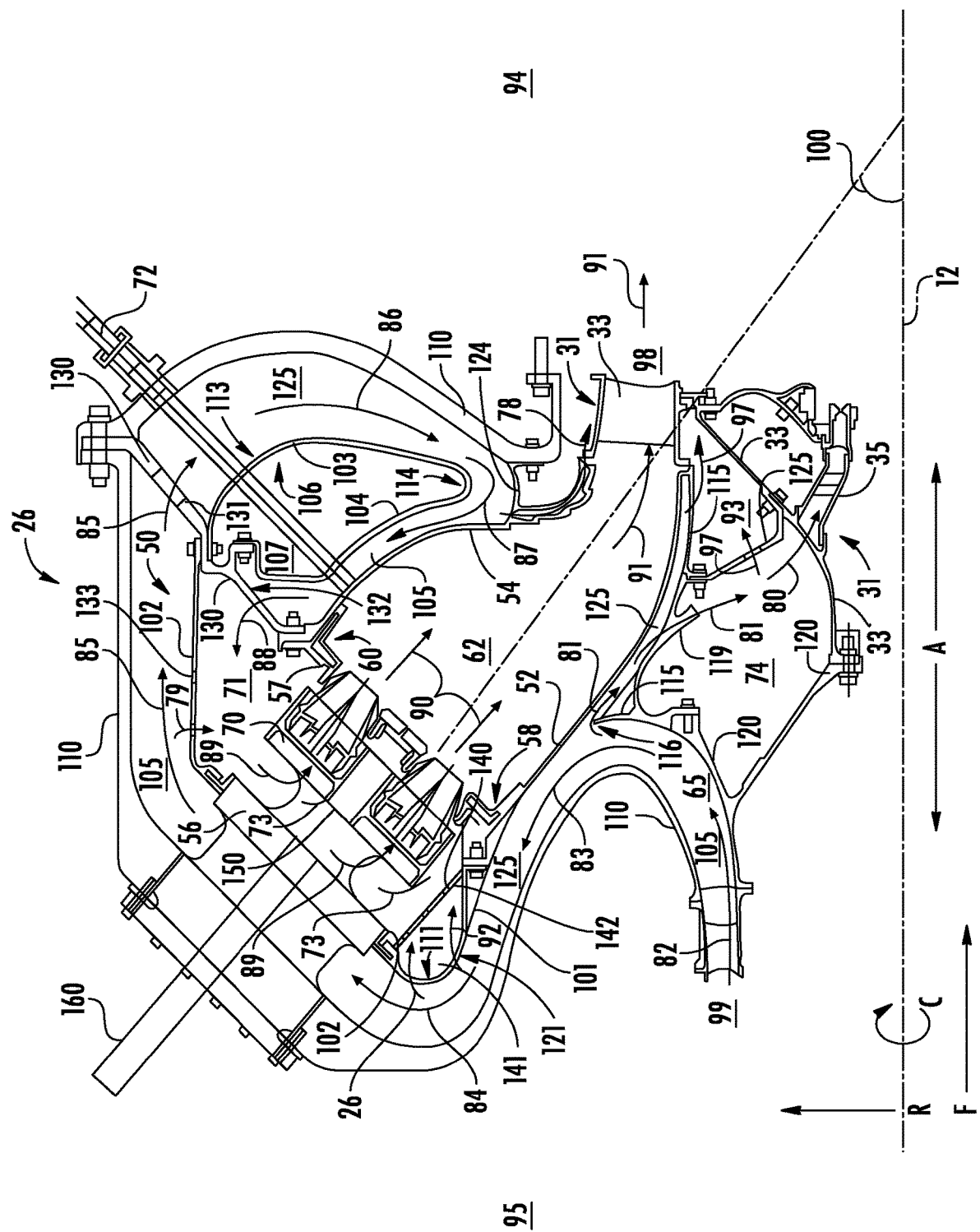
FIG. 2 is an axial cross sectional view of an exemplary embodiment of a combustor assembly of the exemplary engine shown in FIG. 1.

FIG. 2 is a cross sectional side view of an exemplary combustion section 26 of the core engine 16 as shown in FIG. 1. As shown in FIG. 2, the combustion section 26 may generally include a combustor assembly 50 having an inner liner 52 and an outer liner 54 each extended at least partially along the axial direction A. The inner liner 52 and the outer liner 54 each extend at least partially at an acute angle 100 relative to the axial centerline 12. A dome assembly 57 is extended between the inner liner 52 and the outer liner 54. The dome assembly 57 is generally coupled to the inner liner 52 and the outer liner 54. A combustion chamber 62 is defined between the inner liner 52, the outer liner 54, and the dome assembly 57.

The dome assembly 57 is extended between upstream ends 58, 60 of the inner liner 52 and the outer liner 54 respectively. The combustor assembly 50 further includes a bulkhead assembly 56 disposed upstream of the dome assembly 57. As shown in FIG. 2, the inner liner 52 is spaced from the outer liner 54 with respect to axial centerline 12 of the engine 10 and defines a generally annular combustion chamber 62 therebetween. In other embodiments, the inner liner 52 and the outer liner 54 may define a can combustor or can-annular combustor assembly, in which each combustor assembly 50 defines a plurality of combustion chambers 62 each defined in adjacent arrangement around the axial centerline 12. In particular embodiments, the inner liner 52, the outer liner 54, and/or the dome assembly 57 may be at least partially or entirely formed from metal alloys or ceramic matrix composite (CMC) materials.

The combustion section 26 further includes an outer casing 110 surrounding the combustor assembly 50. The outer casing 110 is extended at least partially along the axial direction A and in a radial direction R extended from the axial centerline 12. The outer casing 110 extends generally co-directional to the inner liner 52 and the bulkhead assembly 56 defining a plurality of walls coupled to the inner liner 52 and generally surrounding the outer liner 54 and dome assembly 57. An inner casing 120 extends at least partially along the axial direction A inward of the combustor assembly 50 and the outer casing 110. The outer casing 110 and the inner casing 120 each extend generally annularly around the axial centerline 12 of the engine 10.

The outer casing 110, the inner casing 120, and the combustor assembly 50 together define a primary flowpath 105 in direct fluid communication with the combustion chamber 62. Additionally, the primary flowpath 105 extends in fluid communication with the compressor section 21 upstream of the combustion section 26, and in fluid communication with the turbine section 31 downstream of the combustion chamber 62 of the combustion section 26. A flow of oxidizer, such as air, shown schematically by arrows 82, enters the combustion section 26 from the upstream end 99. In serial flow order, the oxidizer 82 flows between the outer casing 110 and the inner casing 120, together defining a prediffuser passage 65 therebetween.

The outer casing 110 and the inner casing 120 together extend along the axial direction A and at least partially along the radial direction R such as to direct the forward flow of oxidizer 82 (i.e., along the axial direction A from a forward end 95 toward an aft end 94, such as along a forward direction F provided schematically for reference) to an outward direction along the radial direction R and toward the forward end 95 along the axial direction A (i.e., at least partially along a reverse direction opposite of the forward direction F), such as shown schematically by arrow 83. The reverse flow of oxidizer 83 is generally defined between the outer casing 110 and the inner liner 52 of the combustor assembly 50. The reverse flow of oxidizer 83 is provided by the outer casing 110 extended generally outward along the radial direction R, and from the forward direction F of the flow of oxidizer 82 toward a reverse direction opposite of the forward direction F along the axial direction A.

The aft flow of oxidizer 83 is further provided between the outer casing 110 and the canted or angled disposition of the inner liner 52 and a portion of the bulkhead assembly 56. The bulkhead assembly 56 includes a plurality of walls extended annularly relative to the axial centerline 12. The bulkhead assembly 56 includes a first wall 101 extended from the inner liner 52. The first wall 101 extends at least partially outward along the radial direction R. The first wall 101 may further extend at least partially in toward the forward end 95 along the axial direction A from the inner liner 52.

The first wall 101 may further define a bend 111 in which the first wall 101 is further disposed toward the aft end 94. As such, the first wall 101 of the bulkhead assembly 56 may extend from the inner liner 52 toward the forward end 95, curve at the bend 111 and extend toward the aft end 94. The first wall 101 may further extend generally outward along the radial direction R. The outer casing 110 is generally co-directional to the first wall 101 such as to define the primary flowpath 105 extending co-directional with the first wall 101 and the outer casing 110. As such, the oxidizer 83 may flow from the reverse direction toward the forward direction F (i.e., from toward the forward end 95 along the axial direction A toward the aft end 94), such as generally provided schematically by arrows 84. The primary flowpath 105 defined by the first wall 101 and the outer casing 110 may further extend outward along the radial direction R to further dispose the oxidizer 84 accordingly.

Portions of the bulkhead assembly 56 may define a bulkhead opening 121 extended therethrough to permit a portion of the flow of oxidizer 84 into a plenum 71 defined between the bulkhead assembly 56 and the dome assembly 57. For example, as generally provided in FIG. 2, the bulkhead opening 121 may be defined through the first wall 101 to permit a portion of the flow of oxidizer 84, the portion shown schematically by arrows 92, to flow into the plenum 71. In one embodiment, the bulkhead opening 121 defines one or more discrete openings or orifices defining a circular, ovular or racetrack, rectangular, polygonal, tear drop, or generally oblong cross section. In other embodiments, the bulkhead opening 121 may be defined at least partially circumferentially around the bulkhead assembly 56. The bulkhead opening 121 may mitigate pressure losses of the oxidizer within the combustion section 26. More specifically, the bulkhead opening 121 may mitigate pressure losses of the oxidizer along the primary flowpath 105 from the prediffuser 65 to the combustion chamber 62.

The bulkhead assembly 56 may further include a second wall 102 coupled to the first wall 101 and extended therefrom. The second wall 102 extends at least partially along the forward direction F toward the aft end 94. In various embodiments, such as shown in FIG. 2, the second wall 102 may further extend at least partially outward along the radial direction R. The outer casing 110 generally defined co-directional with the second wall 102 further defines with the second wall 102 the primary flowpath 105 generally along the forward direction F and further disposing the flow of oxidizer along the forward direction F, such as shown schematically by arrows 85.

The bulkhead assembly 56 may further include a third wall 103 coupled to the second wall 102 and extended at least partially inward along the radial direction R. The outer casing 110 is extended generally co-directional to the third wall 103 and defines the primary flowpath 105 accordingly therebetween. As such, the flow of oxidizer, shown schematically as arrows 86, is disposed inward along the radial direction R.

The third wall 103 may generally define at least a portion of a contoured fairing 106 defining one or more bends. For example, the third wall 103 may define a third bend 113 inward along the radial direction R, thereby disposing outer casing 110, defined co-directional to the third wall 103, and the primary flowpath 105 defined therebetween, inward along the radial direction R.

The bulkhead assembly 56 may further define a fourth wall 104 coupled to the third wall 103 and further defining at least a portion of the contoured fairing 106. For example, the third wall 103 may define a fourth bend 114 and the fourth wall 104 extended therefrom along the aft direction (opposite of the forward direction F) toward the forward end 95 along the axial direction A. In various embodiments, the fourth wall 104 further extends at least partially outward along the radial direction R.

The fourth wall 104 may extend at least partially co-directional or parallel to the outer liner 54 and further define the primary flowpath 105 therebetween. A flow of oxidizer, shown schematically as arrows 87, flows from the primary flowpath 105 between the outer casing 110 and the third wall 103 portion of the contoured fairing 106 to the primary flowpath 105 between the fourth wall 104 portion of the contoured fairing 106 and the outer liner 54. Accordingly, the oxidizer 87 flows from the generally radially inward direction (depicted as oxidizer 86) around the bend 114 and at least partially along the aft direction toward the forward end 95. The third wall 103 and the fourth wall 104 together defining the contoured fairing 106 may enable turning of the flow of oxidizer 86, 87, 88 such as to mitigate pressure losses, thereby improving combustion section 26 efficiency and performance.

The fourth wall 104 may generally extend toward the third wall 103, the second wall 102, or both such as to define a first cavity 107 therebetween. In various embodiments, the first cavity 107 is fluidly segregated from the primary flowpath 105. In one embodiment, the cavity 107 defined by within the second wall 102, the third wall 103, and the fourth wall 104 provides damping of flow fluctuation in the primary flowpath 105.

Figure 5:
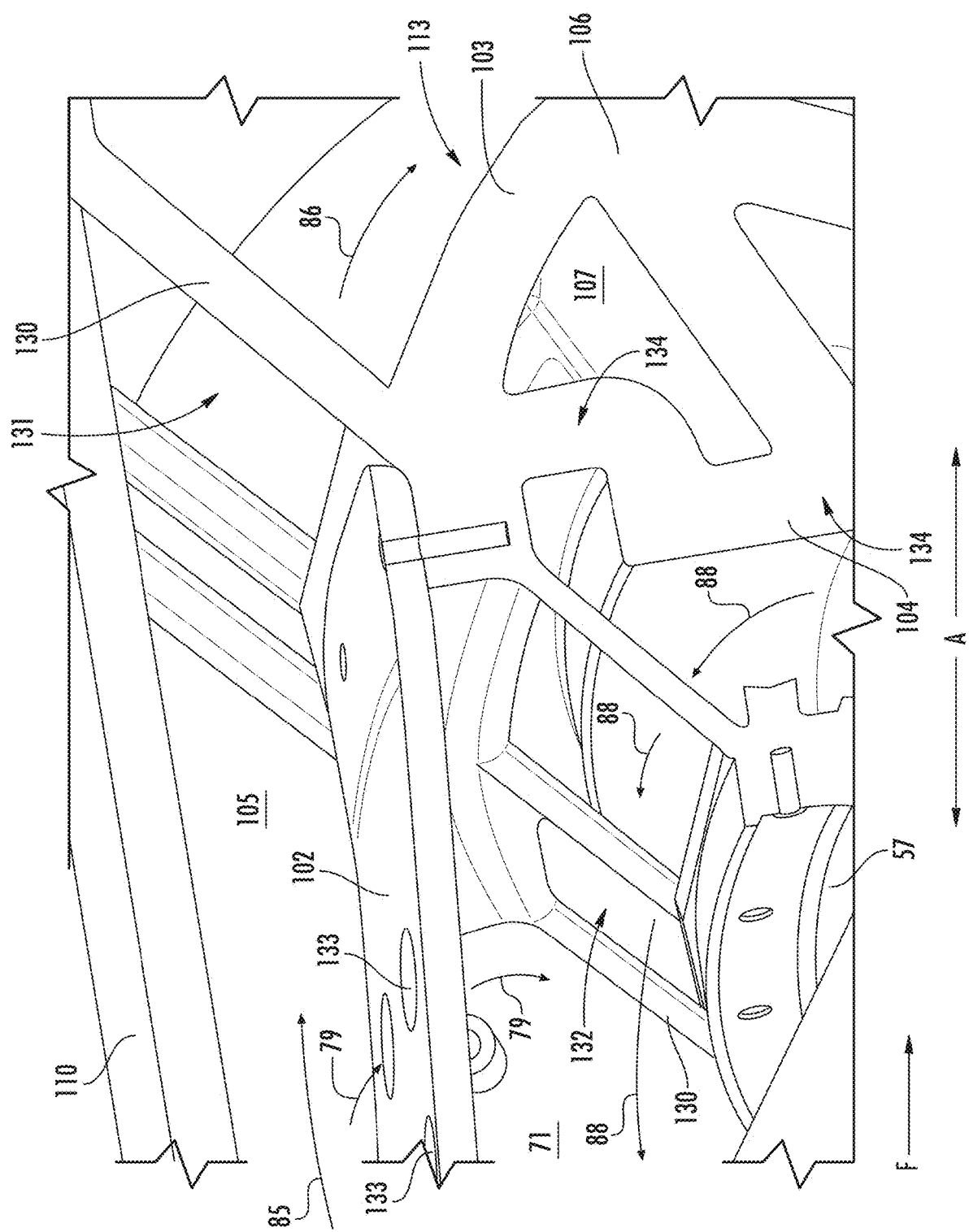
FIG. 5 is a detailed perspective view of another portion of an exemplary embodiment of the combustor assembly generally provided in FIG. 2.

The combustion section 26 may further include a mount member 130 extended from and coupled to the outer casing 110 and the combustor assembly 50. Referring to FIG. 5, a perspective view of an embodiment of the combustion section 26 providing further detail of the mount member 130 is generally provided. In the embodiment provided in FIGS. 2 and 5, the mount member 130 is coupled to the outer liner 54, the dome assembly 57, or both. In other embodiments, the mount member 130 is coupled to the inner liner 52, the dome assembly 57, or both.

Referring still to FIGS. 2 and 5, the mount member 130 defines a first opening 131 through the mount member 130 enabling the flow of oxidizer 85 to pass through along the primary flowpath 105 between the outer casing 110 and the contoured fairing 106. The mount member 130 further defines a second opening 132 through the mount member 130 enabling a flow of oxidizer, shown schematically as arrows 88, to flow therethrough along the primary flowpath 105. More specifically, the second opening 132 may be defined through the mount member 130 enabling the flow of oxidizer 88 to flow from the primary flowpath 105 between contoured fairing 106 and the outer liner 54 into a plenum 71 defined between the bulkhead assembly 56 and the dome assembly 57.

Referring to FIG. 5, the bulkhead assembly 56, or more specifically, the third wall 103, the fourth wall 104, or the contoured fairing 106, may include a substantially radial portion 134 coupling the contoured fairing 106 to the mount member 130. The radial portion 134 of the contoured fairing 106 is defined generally within the primary flowpath 125 between the outer liner 54 and the mount member 130, such as upstream of the plenum 71. The contoured fairing 106, including the substantially radial portion 134, may generally mitigate flow separation and pressure losses by enabling flow attachment to the contoured fairing 106. Although generally provided as a rectangular cross sectional area, the first opening 131 and the second opening 132 may each define a circular, ovular or racetrack, polygonal, tear drop, or oblong cross sectional area, or combinations thereof.

In various embodiments, the plenum 71 is defined between the dome assembly 57 and the second wall 102 of the bulkhead assembly 56. In one embodiment, the plenum 71 defines a collector in which any variations in pressure of the oxidizer along the primary flowpath 105 upstream thereof may normalize before egressing from the plenum 71 into the combustion chamber 62 through a fuel injector assembly 70. A flow of oxidizer from the plenum 71, shown schematically by arrows 89, egresses from the plenum 71 into the fuel injector assembly 70.

In still various embodiments, the plenum 71 is further defined between the mount member 130, the dome assembly 57, and the bulkhead assembly 56. As such, the mount member 130 may enable defining the plenum 71 as a cavity in which the pressure of the oxidizer is normalized (e.g., evened or leveled, such as generally or substantially along a circumferential direction C around the axial centerline 12 such that circumferential differences in pressure are reduced or eliminated).

Figure 7:
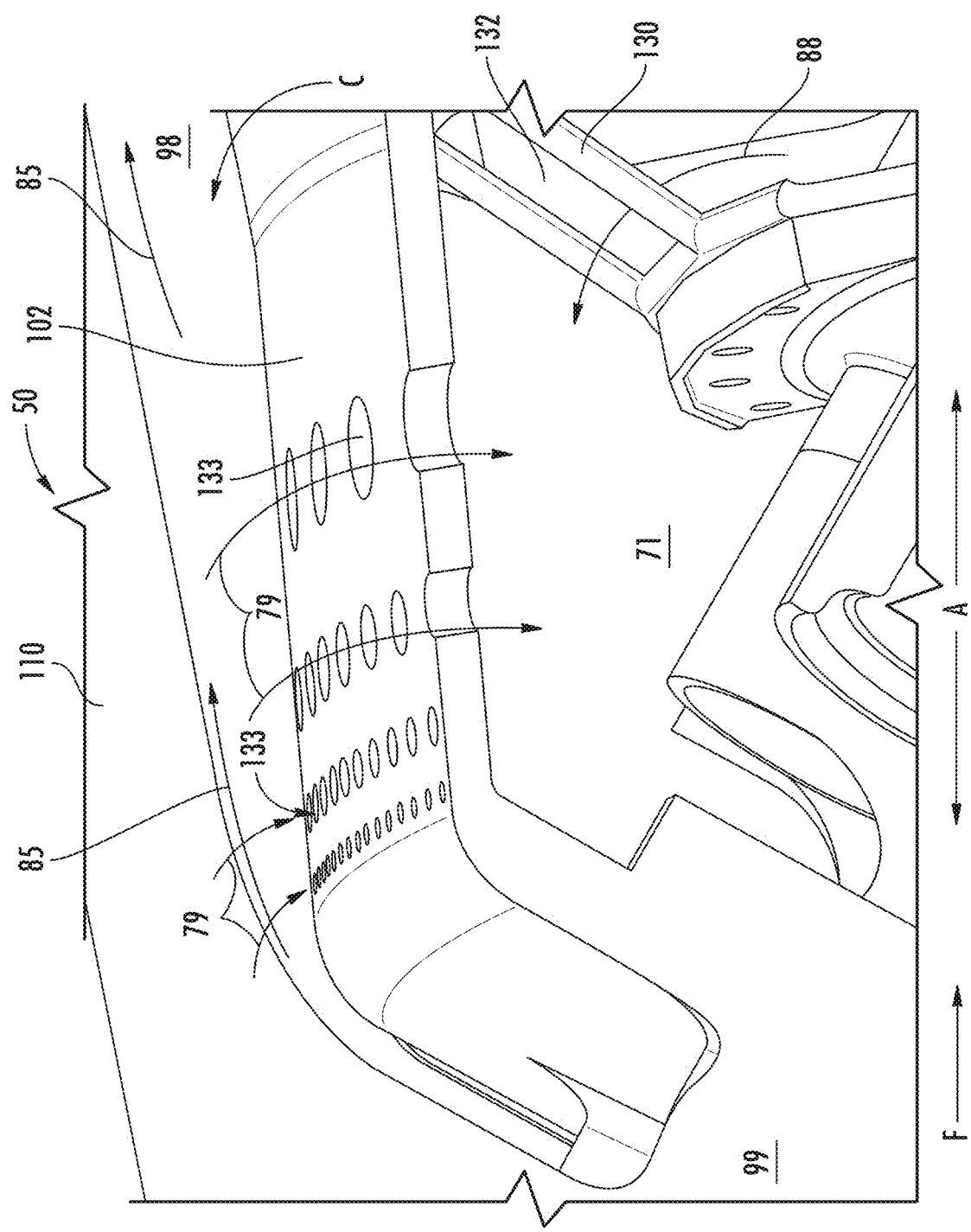
FIG. 7 is yet another detailed perspective view of a portion of an exemplary embodiment of the combustor assembly generally provided in FIG. 2.

Referring briefly to FIG. 7, a detailed perspective view of an exemplary embodiment of the second wall 102 is generally provided. The second wall 102 further defines a second wall opening 133 defined therethrough providing fluid communication between the primary flowpath 105 between the second wall 102 of the bulkhead assembly and the outer casing 110, and the primary flowpath 105 at the plenum 71. A portion of the flow of oxidizer 85, shown schematically as arrows 79, ingresses through the second wall opening 133 into the plenum 71. The second wall opening 133 mitigates pressure losses along the primary flowpath 105 and at the bend 114.

In various embodiments, the second wall opening 133 is defined as a plurality of openings 133 in circumferential arrangement. In one embodiment, such as generally provided in FIG. 7, the second wall opening 133 is defined as a plurality of circumferential rows along the second wall 102. The plurality of rows may define second wall openings 133 of increasing cross sectional area. For example, such as generally provided in FIG. 7, a first upstream row may define a smallest cross sectional area and a last downstream row may define a largest cross sectional area, in which any number of rows therebetween may define an increasing cross sectional area from the upstream first row and the downstream last row. In still various embodiments, a total cross sectional area of the plurality of second wall openings 133 of each row may be defined increasing from circumferential row to circumferential row, such that a total cross sectional area of the last downstream row is greater than the total cross sectional area of the first upstream row. It should be appreciated that although generally depicted as a circular cross section, the second wall openings 133 may define an ovular or racetrack, tear drop, rectangular, polygonal, or oblong cross sectional area, or combinations thereof.

Referring back to FIG. 2, the fuel injector assembly 70 is extended through the outer casing 110, the bulkhead assembly 56, and at least partially through the dome assembly 57. In various embodiments, the fuel injector assembly 70 may more specifically extend through the second wall 102 of the bulkhead assembly 56.

In various embodiments, the fuel injector assembly 70 may extend generally approximately along the angle 100 at which the inner liner 52 and outer liner 54 are generally disposed. For example, the fuel injector assembly 70 may extend co-linear to at least a portion of the inner liner 52 and the outer liner 54. In other embodiments, the fuel injector assembly 70 may extend oblique relative to the angle 100, such as parallel or perpendicular to the axial centerline 12, or one or more angles therebetween.

The fuel injector assembly 70 provides a flow of liquid or gaseous fuel (or combinations thereof) to the combustion chamber 62. The flow of oxidizer 89 passes through the fuel injector assembly 70 and through the dome assembly 57 to mix with the fuel and form a fuel-air mixture 90 before ignition in the combustion chamber 62. An accessory 72 extends through the outer casing 110 and at least partially through the outer liner 54 adjacent to the combustion chamber 62. In various embodiments, the accessory 72 extends through the contoured fairing 106. The contoured fairing 106 provides structural support for the accessory 72 extended through the outer casing 110 and at least partially through the outer liner 54. The accessory 72 may define an igniter utilized to combust the fuel-air mixture 90 to produce combustion gases 91 that then flow downstream to the turbine section 31.

It should be appreciated that the accessory 72 may further define a sensor, such as a pressure probe, thermocouple, etc., utilized to measure one or more of a static or dynamic pressure, temperature, etc. at the combustion chamber 62. In various embodiments, the accessory 72 may extend through the outer casing 110 and through the inner liner 52 adjacent to the combustion chamber 62.

Figure 3:
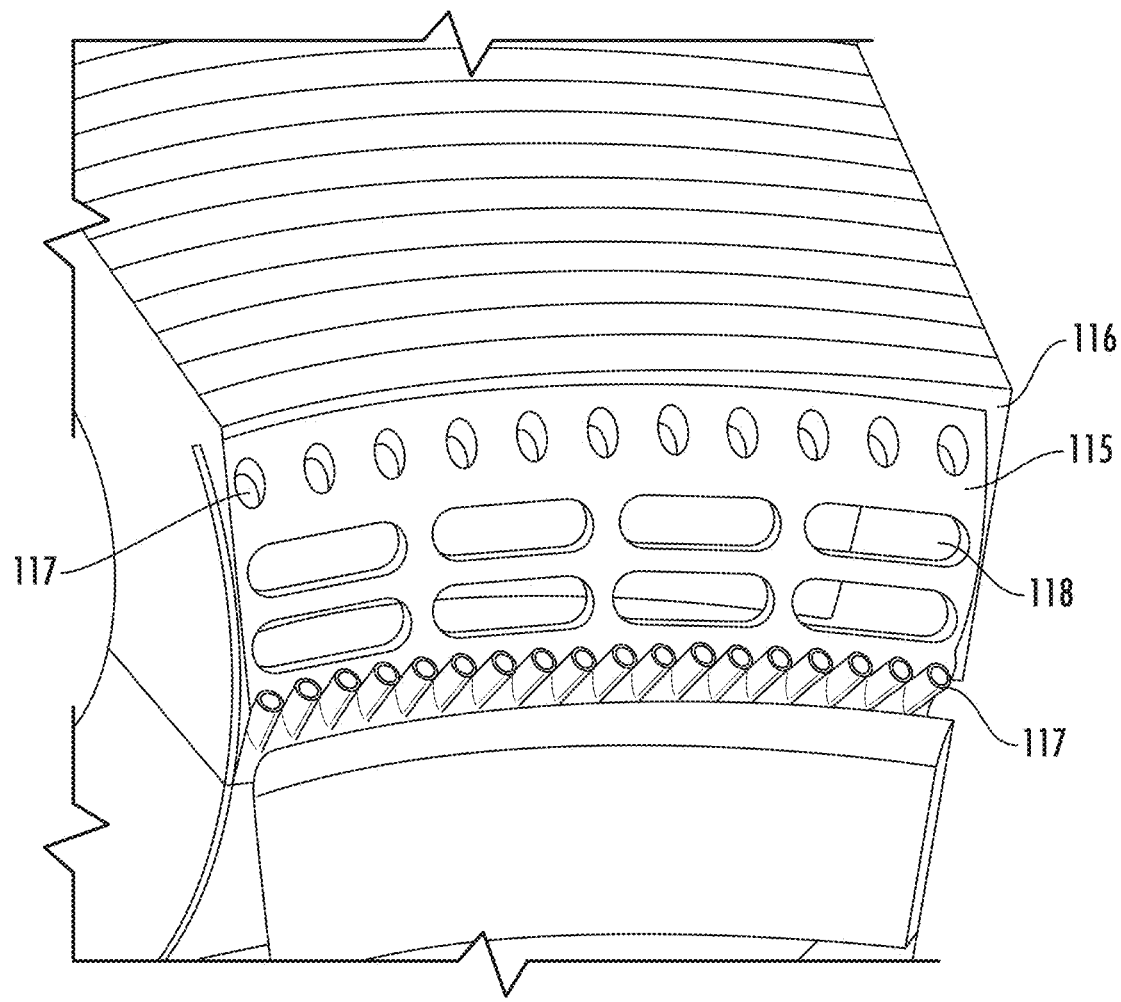
FIG. 3 is a detailed view of a portion of an exemplary embodiment of the combustor assembly generally provided in FIG. 2.

Referring back to the fuel injector assembly 70, a fuel injector fairing 73 is coupled to the fuel injector assembly 70 to guide the oxidizer 89 into and through the fuel injector assembly 70. The fuel injector fairing 73 defines a contoured wall extended at least partially along the axial direction A toward a direction from which the flow of oxidizer 89 comes. For example, as shown in FIG. 3, the oxidizer 89 flows in the aft direction toward the forward end 95 from the plenum 71 to the fuel injector assembly 70. The fuel injector fairing 73 is extended at least partially toward the aft end 94 of the combustion section 26 from which the oxidizer 89 comes from the plenum 71.

The combustion section 26 including the combustor assembly 50, outer casing 110, and inner casing 120 together defines a primary flowpath 105 providing a forward direction and aft direction flow of oxidizer providing convective cooling to the inner liner 52, the outer liner 54, and other portions of the combustion section 26. The various embodiments of the combustion section 26 generally provided enable approximately the entire flow of oxidizer from the upstream compressor section 21 to be utilized for convective cooling of the combustion section 26 including the inner liner 52 and the outer liner 54.

The combustion section 26 may further include an inner casing fairing 115 coupled to the inner casing 110. The inner casing fairing 115 is extended at least partially co-directional with the inner liner 52. The inner casing fairing 115 directs the flow of oxidizer 82 from the forward direction F between the prediffuser 65 defined between the outer casing 110 and the inner casing 120 to the aft direction along the primary flowpath 105 between the outer casing 110 and the inner liner 52.

In the embodiment generally provided in FIG. 2, the inner casing fairing 115 extends at least partially outward along the radial direction R. The inner casing fairing 115 may further extend at least partially along the aft direction (opposite of the forward direction F along the axial direction A). In one embodiment, the inner casing fairing 115 defines a tip 116 extended at least partially along the aft direction and at least partially outward along the radial direction R.

Figure 6:
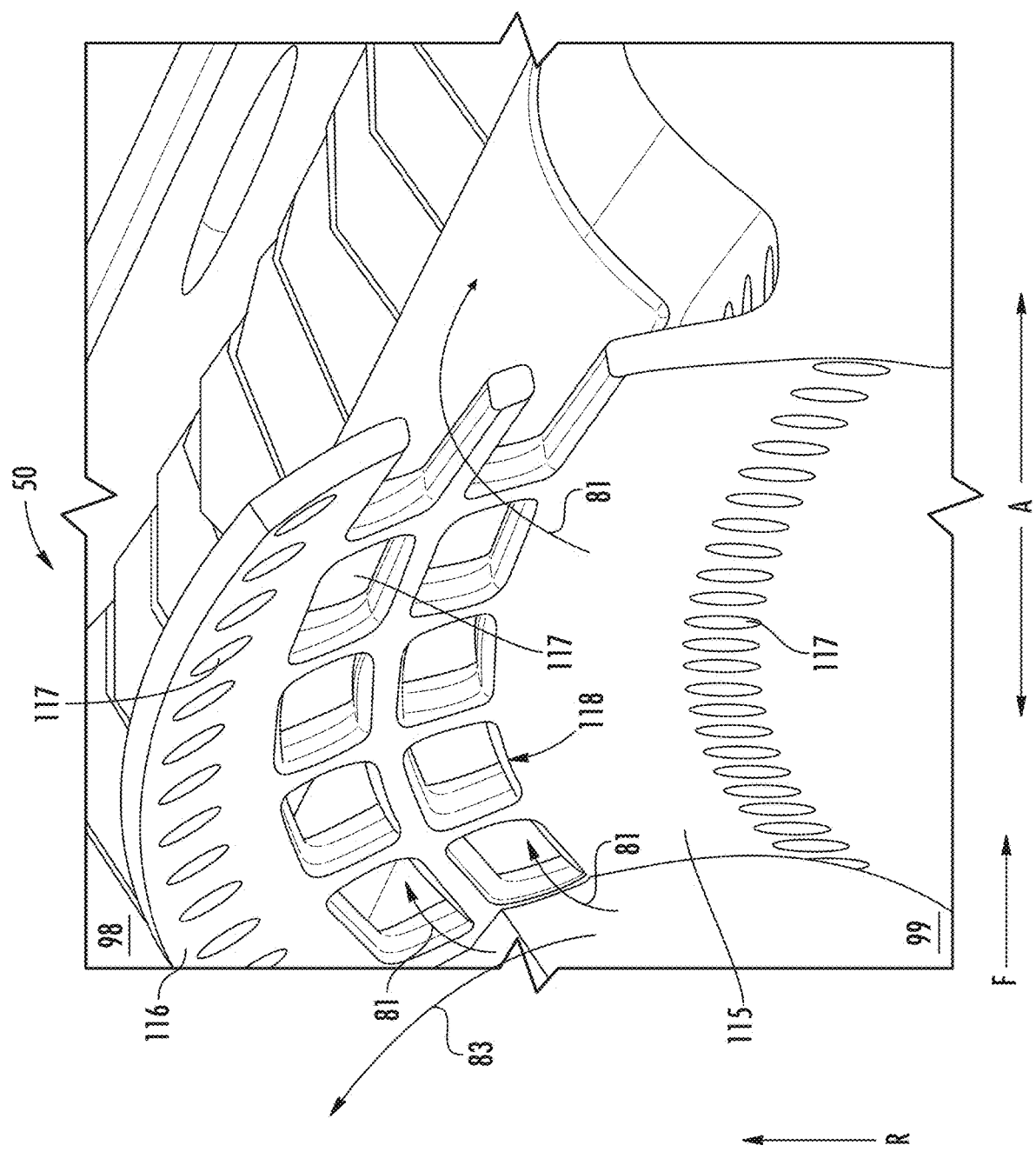
FIG. 6 is another detailed perspective view of a portion of an exemplary embodiment of the combustor assembly generally provided in FIG. 2.

Referring now to FIGS. 3 and 6, exemplary embodiments of the inner casing fairing 115 are generally provided. The tip 116 of the inner casing fairing 115 may define one or more tip openings 117 through the inner casing fairing 115. A portion of the flow of oxidizer 83 egresses through the tip openings 117 through the tip 116 of the inner casing fairing 115. Extraction of flow 81 through the tip openings 117 helps mitigate flow separation as the flow of oxidizer 83 is directed from the forward direction F to the outward radial direction and the aft direction. In various embodiments, the high velocity of the portion of the flow of oxidizer 81 flowing through the tip openings 117 into a passage 125 between the inner liner 52 and the inner casing fairing 115 produces high turbulence within the passage 125, thereby improving cooling of the inner liner 52 via improved heat transfer coefficient.

For example, during operation of the engine 10 and combustion section 26, the flow of oxidizer 82 passes through the prediffuser 65 is split into the flow of oxidizer 83 (e.g., further directed to the combustion chamber 62) and flow of oxidizer 81. The flow of oxidizer 81 passes through openings 117 (and openings 118, further described below) through the tip 116 of the inner casing fairing 115, providing the flow of oxidizer 81 through passage 125. The flow of oxidizer 81 through the openings 117, 118 in the tip 116 mitigate separation of flow of oxidizer 83, and pressure losses, relative to surfaces of the inner casing fairing 115 and, more generally, the inner casing 120, as the flow 82 is directed from the forward direction F toward the aft direction, as shown as flow 83. Still further, the inner casing fairing 115, such as the openings 117, 118 defined through the tip 116, induce turbulence in the flow of oxidizer 81, thereby promoting heat transfer at the inner liner 52 (e.g., providing cooling to the inner liner 52).

Referring still to FIGS. 3 and 6, the inner casing fairing 115 may define a plurality of rows of tip openings 117 therethrough to the passage 125. For example, the openings 117 may define a first downstream row (i.e., proximate to the upstream end 99) defining a cross sectional area smaller than a second or more upstream row (i.e., proximate to the downstream end 98), indicated by second tip openings 118. The smaller first downstream row enables gradual extraction of the flow, from the flow of oxidizer 83 through the openings as flow 81, while mitigating flow separation and pressure losses of the flow of oxidizer 83 as it continues from the forward direction F to the outward radial direction and aft direction.

Referring back to FIG. 2, in various embodiments, a portion of the flow of oxidizer 82, shown schematically as arrows 81, flows around or through the tip 116 of the inner casing fairing 115 and into one or more ports 119 defined through the inner casing fairing 115. The port 119 may define an annular passage extended at least partially circumferentially around the axial centerline 12. In another embodiment, the port 119 may define discrete openings or orifices in serial arrangement around the axial centerline 12, such as openings defining a circular, ovular, rectangular, or oblong cross section.

In various embodiments, the port 119 is defined approximately mid-span of the length of combustion chamber 62 of the combustor assembly 50 (i.e., approximately mid-span of the length along the axial direction A from the dome assembly 57 to the turbine section 31). In one embodiment, the port 119 is disposed inward of the inner liner 62 between approximately 30% and approximately 70% axial span of the combustion chamber 62. In another embodiment, the port 119 is disposed inward of the inner liner 62 between approximately 40% and approximately 60% axial span of the combustion chamber 62.

In one embodiment, the oxidizer 81 egresses from the passage 125 between the inner casing fairing 115 and the inner liner 52 through the port 119 and into a second cavity 74. The second cavity 74 is defined between the inner casing fairing 115 and inner casing 120. The second cavity 74 may further be defined between the turbine section 31, the inner casing fairing 115, and the inner casing 120. The turbine section 31 may define a nozzle assembly 33 in serial arrangement with and downstream of the combustion section 26.

In another embodiment, the oxidizer 81 may flow from the openings 117 through the inner casing fairing 115 directly into the second cavity 74.

In various embodiments, the oxidizer 81 may flow into the second cavity 74 through a fairing wall 126 separating the second cavity 74 from a third cavity 93. The third cavity 93 is defined between the fairing wall 126, the inner casing fairing 115, and the turbine section 31, or more specifically, the nozzle assembly 33. The flow of oxidizer into the third cavity 93, shown schematically by arrows 97, may ingress into the third cavity 93 from the passage 125 through the inner casing fairing 115, through the fairing wall 126, or both. The flow of oxidizer 97 may then egress the third cavity 93 through the first turbine vane of the nozzle assembly 33, thereby providing cooling.

The nozzle assembly 33 may include an inducer 35 defining a plurality of vanes or passages configured to accelerate a flow of oxidizer 80 from the second cavity 74 through the inducer 35 to provide cooling to the turbine section 31. Disposing the port 119 approximately mid-span of the combustion chamber 62 enables the flow of oxidizer 81 therethrough to the inducer 35 may provide improved back flow margin at the inducer 35. Additionally, disposing the port 119 approximately mid-span of the combustion chamber 62 may enable higher heat transfer coefficients at a portion of the inner liner 52 forward of the port 119. For example, the higher heat transfer coefficients may be enabled within the 50% span from the dome assembly 57 to a portion of the inner liner 52 corresponding to the position of the port 119 along the axial direction A.

In various embodiments of the combustor assembly 50, a forward end 95 portion of the inner liner 52, the outer liner 54, or both is convectively cooled by the flow of oxidizer 83, 87, 88, flowing adjacent to liners 52, 54. A portion of the flow of oxidizer, such as schematically shown as the flow of oxidizer 81 within the passage 125, the flow of oxidizer 97 ingressing into the third cavity 93, or both, may at least partially convectively cool an aft end 94 portion of the inner liner 52. A flow fairing wall 124 may be disposed within the primary flowpath 125 opposite of the fourth bend 114 of the contoured fairing 106 to help direct the flow of oxidizer 86 from the radially inward direction toward the aft and radially outward directions. A portion of the flow of oxidizer 86 may be utilized through a portion of the outer liner 54 forward of the flow fairing wall 124 to provide film cooling therethrough, such as shown schematically by arrows 78. Still further, the flow of oxidizer 78 may further ingress into the first turbine vane of the nozzle assembly 33, providing cooling therethrough.

Figure 4:
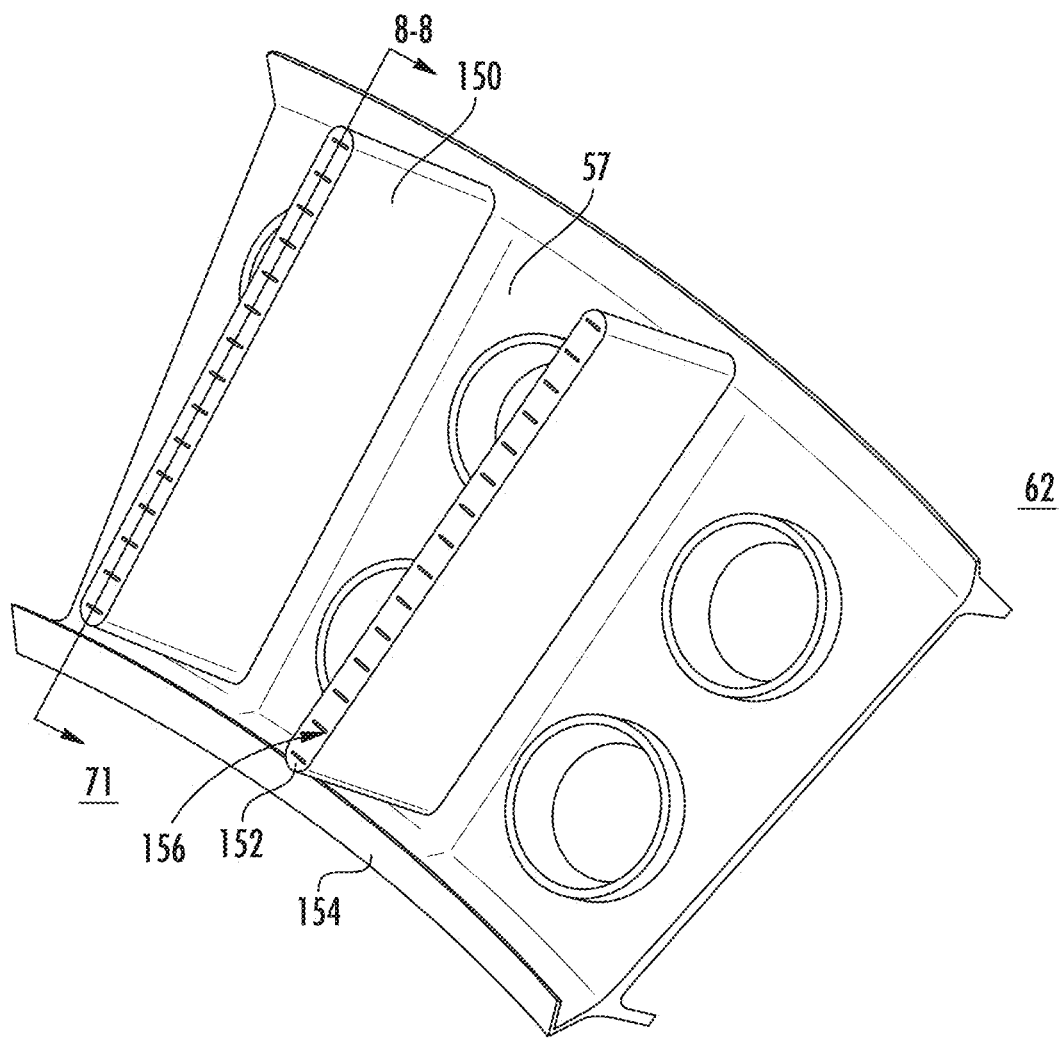
FIG. 4 is a detailed perspective view of a another portion of an exemplary embodiment of the combustor assembly generally provided in FIG. 2.

Referring now to FIG. 4, an exemplary embodiment of a portion of the dome assembly 57 including a damper assembly 150 is generally provided. The combustion section 26 may further include the damper assembly 150 coupled to the dome assembly 57 within the plenum 71. The damper assembly 150 may define one or more damper passages 152 extended within the walls 154 of the damper assembly 150 in fluid communication with the combustion chamber 62 and defining a volume configured to dampen one or more acoustic modes.

In various embodiments, the damper assembly 150 defines a Helmholtz damper in which a target frequency, or range thereof, of pressure oscillations of which damper assembly 150 may attenuate may be defined by the equation:

$$f = \frac{c}{2\pi} \sqrt{\left(\frac{A}{VL'}\right)}$$

where $f$ is the frequency, or range thereof, of pressure oscillations to be attenuated; c is the velocity of sound in the fluid (i.e., oxidizer or combustion gases); A is a cross sectional area of the opening of the damper passage 152; V is the volume of the damper passage 152, the damper volume 153 (shown and described in regard to FIG. 8), or both; and L' is the effective length of the damper passage 152. In various embodiments, the effective length is the length of the damper passage 152 plus a correction factor generally understood in the art multiplied by the diameter of the area of the damper passage 152.

In still various embodiments, a plurality of the damper assembly 150 may be disposed in circumferential arrangement around the axial centerline 12 on the dome assembly 57. The circumferential arrangement of the damper assembly 150 may mitigate or break up acoustic mode shapes from propagating along the circumferential direction C. In still another embodiment, the damper assembly 150 may provide structural support to the dome assembly 57. For example, the damper assembly 150 may be further coupled to the bulkhead assembly 56.

Figure 8:
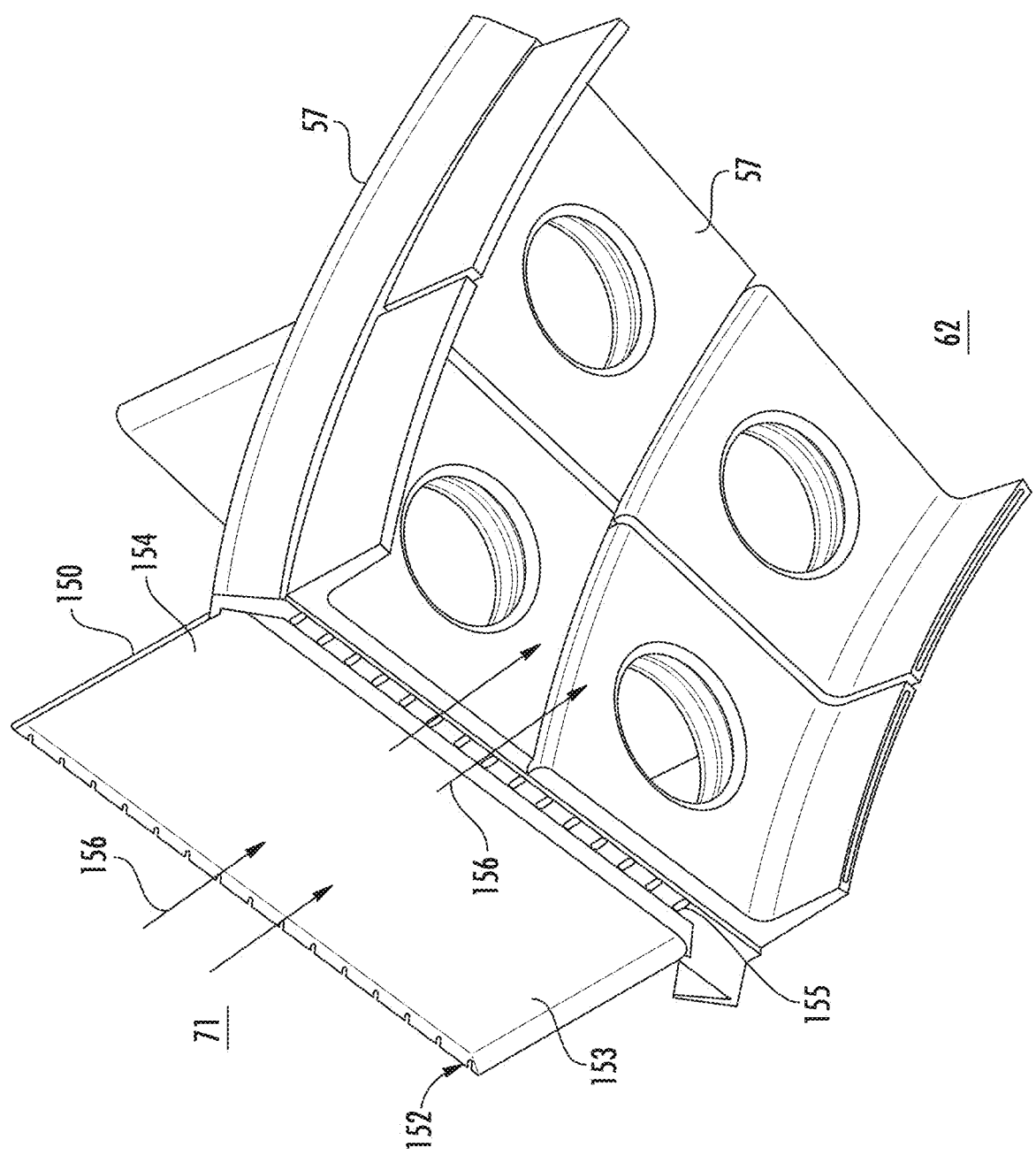
FIG. 8 is a detailed perspective view of yet another portion of an exemplary embodiment of the combustor assembly generally provided in FIG. 2.

Referring now to FIG. 8, another perspective view and partial cutaway of the damper assembly 150 shown in FIG. 4 is generally provided. As shown in FIG. 8, a relatively small amount of flow, shown schematically by arrows 156, egresses from plenum 71 to the combustion chamber 62 through the damper passages 152. The flow 156 egresses through the damper passages 152 of the damper assembly 150 into a damper volume 153 defined within the walls 154 of the damper assembly 150. The damper assembly 150 and the dome assembly 57 define a damper passage exit 155 proximate to the combustion chamber 62. The damper passage exit 154 is in fluid communication with the damper volume 153, enabling the flow 156 from the plenum 71 through the damper passages 152, the damper volume 153, and egressing into the combustion chamber 62 through the damper passage exit 155.

In various embodiments, the damper passage 152, the damper passage exit 155, or both may define a circular, ovular or racetrack, polygonal, or oblong cross sectional area. The damper passage 152 may be generally configured as a Helmholtz damper such as previously described in regard to FIG. 4. More specifically, the damper passage 152 may generally provide metering or partial restriction of the flow 156 through the damper volume 153 to the combustion chamber 62 based at least on a desired effective flow area.

Referring back to FIG. 2, the combustion section 26 may further include a damper member 140 coupled to the dome assembly 57 and the bulkhead assembly 56. The damper member 140 may extend within the plenum 71 to each of the dome assembly and the bulkhead assembly 56. In one embodiment, such as generally provided in FIG. 2, the damper member 140 is coupled to the first wall 101 of the bulkhead assembly 56. Disposition of the damper member 140 within the plenum 71, such as defining a premixing cavity, may provide improved attenuation of undesired acoustic modes.

In one embodiment, the damper member 140 may extended generally circumferentially within the plenum 71. The damper member 140 and the first wall 101 together define a volume 141 therebetween. The damper member 140 defines a damper opening 142 extended through the damper member 140. The damper opening 142 defined through the damper member 140 provides fluid communication between the volume 141 and the plenum 71. For example, the damper opening 142 enables egress of flow 92 from the primary flowpath 125 through the bulkhead opening 121 in the first wall 101 through the volume 141 and to the plenum 71. The bulkhead opening 121, the damper opening 121 and the volume 141 may each be defined as a Helmholtz damper such as described in regard to FIG. 4 to attenuate pressure oscillations at the combustor assembly 50.

In various embodiments, the combustor assembly 50 may further include a resonator tube 160 extended through the outer casing 110 and the bulkhead assembly 56 in fluid communication with the plenum 71 defined between the bulkhead assembly 56 and the dome assembly 57. The combustor assembly 50 may enable deeper immersion or more proximate placement of the resonator tube 160 within a premixer or plenum 71 cavity to more effectively attenuate one or more acoustic modes. In various embodiments, the resonator tube 160 defines a quarter wave tube defining the one or more volumes, lengths, and cross sectional areas relative to attenuating an acoustic pressure oscillation of one or more frequencies from the combustor assembly 50. In one embodiment, the resonator tube 160 in alternating circumferential arrangement between each fuel injector assembly 70. In other embodiments, the resonator tube 160 is defined through the fuel injector assembly 70, such as through the bulkhead assembly 56 in fluid communication with the plenum 71.

Referring now to FIGS. 1-7, the engine 10 receives a flow of oxidizer 77, such as air, through the annular inlet 20 into the compressor section 21. As the oxidizer 77 flows across successive stages of the compressor section 21, the oxidizer increases in pressure and is routed to the combustion section 26 as compressed oxidizer, such as shown schematically by arrows 82. As previously discussed, the oxidizer 82 flows through the combustion section 26 to produce combustion gases 91 that are routed downstream to the turbine section 31. The combustion gases 91 expand at the turbine section 31 to drive the HP turbine 28 and LP turbine 30, which then drives the HP compressor 24 and the LP compressor 22, respectively. The combustion gases 91 further drive the power turbine 14 to drive an electrical load device.

All or part of the combustor assembly may be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct the combustor 50, including, but not limited to, the bulkhead 56, the bulkhead support 61, the liners 52, 54, or combinations thereof. Furthermore, the combustor assembly may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include high-strength steels, nickel and cobalt-based alloys, and/or metal or ceramic matrix composites, or combinations thereof.

Various descriptions and figures depicting one or more openings (e.g., 121, 131, 132, 133, 117, 118, 119, etc.) may be depicted as one or more of a generally circular, ovular, elliptical, or racetrack, rectangular, polygonal, tear drop, or oblong cross sectional area. It should be appreciated that the depictions provided may include combinations thereof along with, or in contrast to, the depictions generally provided in the figures. As such, although one or more openings, orifices, etc. shown and described herein may define one or more of the aforementioned cross sectional areas, it should be appreciated that various embodiments may include one or more of the aforementioned cross sectional areas, or combinations thereof, not presently depicted in the figures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustion section for a gas turbine engine, the combustion section defining a radial direction, a circumferential direction, a longitudinal centerline extended along a longitudinal direction, and a forward direction toward a downstream end and an aft direction toward an upstream end, the combustion section comprising:
a combustor assembly comprising:
an inner liner and an outer liner each extended at least partially along a lengthwise direction and at an acute angle relative to the longitudinal centerline;
a dome assembly extended between the inner liner and the outer liner, wherein the dome assembly, the inner liner, and the outer liner together define a combustion chamber therebetween; and
a bulkhead assembly defining a plurality of walls coupled to the inner liner and surrounding the outer liner and the dome assembly, wherein at least a portion of the bulkhead assembly is extended at least partially along a forward direction and defines a plenum between the bulkhead assembly and the dome assembly;
an outer casing surrounding the combustor assembly, wherein the outer casing is extended at least partially co-directional to the combustor assembly;
a fuel injector assembly extended through the outer casing, the bulkhead assembly, and the dome assembly; and
an inner casing, wherein the outer casing, the inner casing, and the combustor assembly together define a primary flowpath in direct fluid communication with the combustion chamber, and wherein the primary flowpath is extended at least along the forward direction and the aft direction defined by the inner casing, the outer casing, and the combustor assembly, and wherein an oxidizer flows through the primary flowpath in serial flow through the plenum and the fuel injector assembly into the combustion chamber, and wherein the inner casing comprises an inner casing fairing having a tip, the inner casing fairing defining a plurality of rows of tip openings, wherein each row of the plurality of rows includes a plurality of tip openings extended through the inner casing fairing.

2. The combustion section of claim 1, wherein the inner casing fairing is extended at least partially co-directional with the inner liner, and wherein the inner casing fairing directs the flow of oxidizer from between the outer casing and the inner casing along the forward direction to the aft direction between the outer casing and the inner liner.

3. The combustion section of claim 2, wherein the tip is extended at least partially outward along the radial direction at which the plurality of rows of tip openings is defined.

4. The combustion section of claim 3, wherein the inner casing fairing defines the plurality of rows of tip openings extended therethrough to a passage defined between the inner liner and the inner casing fairing, wherein the plurality of rows of tip openings defines at least a first row defining a cross sectional area smaller than a second row defining a larger cross sectional area downstream of the first row.

5. The combustion section of claim 1, wherein the inner casing fairing defines a port disposed between 30% and 70% of an axial span of the combustion chamber, wherein the port provides a flow of oxidizer to a nozzle assembly of a turbine section.

6. The combustion section of claim 1, further comprising:
a fairing wall disposed between the inner casing fairing and a nozzle assembly, wherein the fairing wall and the inner casing fairing together define a cavity therebetween, wherein a flow of oxidizer egresses from the cavity to the nozzle assembly to provide cooling therethrough.

7. The combustion section of claim 1, wherein the fuel injector assembly comprises a fuel injector fairing defining a contoured wall extended at least partially toward an aft end of the combustor assembly, wherein the fuel injector fairing guides the flow of oxidizer from the plenum through the fuel injector assembly to the combustion chamber.

8. The combustion section of claim 1, wherein the bulkhead assembly defines a contoured fairing directing the flow of oxidizer from an inward radial direction to an outward radial direction between the outer liner and the bulkhead assembly.

9. The combustion section of claim 8, wherein the contoured fairing defines a first cavity therewithin, the first cavity providing damping of flow fluctuation of the flow of oxidizer in the primary flowpath.

10. The combustion section of claim 8, wherein at least a portion of the contoured fairing defines a substantially radial portion coupling the contoured fairing to a mount member extended from the outer casing to the combustion assembly, wherein the radial portion promotes flow attachment to the contoured fairing, the outer liner, or both.

11. The combustion section of claim 1, further comprising a damper member extended from the dome assembly to the bulkhead assembly, wherein the damper member provides attenuation of acoustic modes.

12. The combustion section of claim 1, further comprising a damper assembly extended from the dome assembly toward the bulkhead assembly, wherein the damper assembly is disposed in circumferential arrangement between two or more fuel injector assemblies.

13. The combustion section of claim 1, wherein the combustor assembly further comprises one or more resonator tubes disposed through the outer casing and the bulkhead assembly in fluid communication with the plenum.

14. The combustion section of claim 1, further comprising an accessory extended through the outer casing, a contoured fairing, and at least partially through the outer liner, wherein the accessory defines one or more of an igniter or a sensor.

15. The combustion section of claim 1, wherein the bulkhead assembly defines a bulkhead opening extended therethrough, wherein the bulkhead opening provides a flow of oxidizer therethrough to the plenum defined between the bulkhead assembly and the dome assembly.

16. The combustion section of claim 1, further comprising a mount member extended from the outer casing to the combustion assembly.

17. The combustion section of claim 16, wherein the mount member defines a first opening through which the primary flowpath extends in fluid communication with the plenum defined between the dome assembly and the bulkhead assembly.

18. The combustion section of claim 1, wherein the acute angle is between 10 degrees and 85 degrees relative to the longitudinal centerline.

19. The combustion section of claim 1, wherein the bulkhead assembly defines a second wall extended at least partially along a forward axial direction at least partially co-directional to the outer casing, wherein a plurality of second wall openings is defined therethrough providing fluid communication between the plenum and the primary flowpath between the outer casing and the bulkhead assembly.

20. The combustion section of claim 19, wherein the second wall defines a plurality of circumferential rows of second wall openings, wherein the plurality of circumferential rows are defined in increasing cross sectional area along the forward direction.

* * * * *